March 18, 1941.　　D. E. TRUCKSESS　　2,235,491
REGULATOR SYSTEM
Filed Oct. 6, 1937　　2 Sheets-Sheet 1
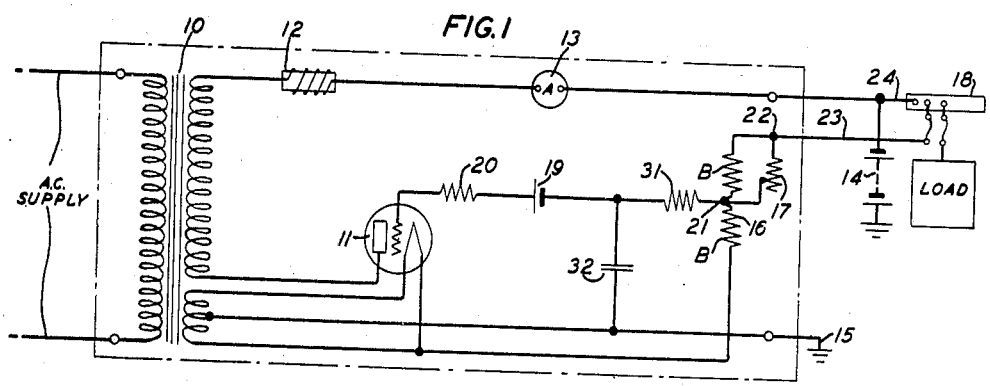
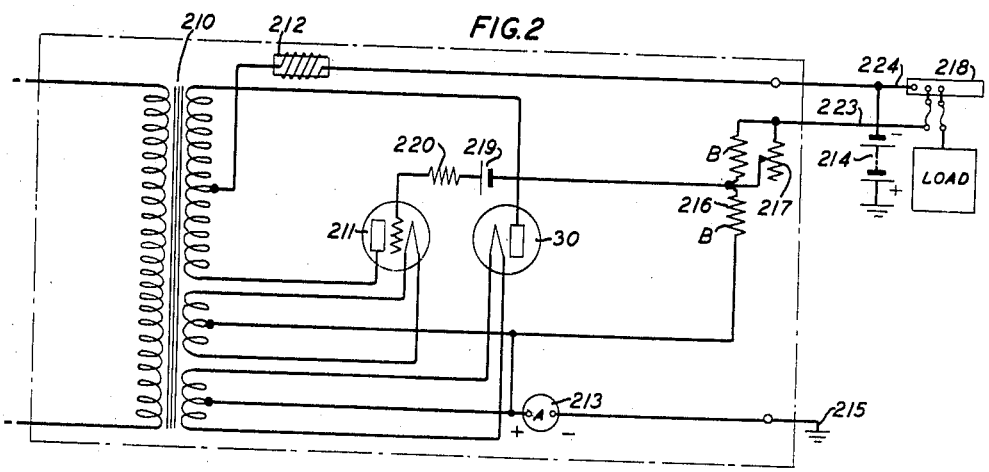
INVENTOR
D. E. TRUCKSESS
BY
ATTORNEY March 18, 1941.    D. E. TRUCKSESS    2,235,491
REGULATOR SYSTEM
Filed Oct. 6, 1937    2 Sheets-Sheet 2

INVENTOR
D. E. TRUCKSESS
BY
ATTORNEY

Patented Mar. 18, 1941

2,235,491

UNITED STATES PATENT OFFICE 2,235,491

REGULATOR SYSTEM

David E. Trucksess, Gillette, N. J., assignor to Bell Telephone Laboratories, Incorporated, New York, N. Y., a corporation of New York Application October 6, 1937, Serial No. 167,521

7 Claims. (Cl. 171—314)

This invention relates in general to systems of voltage regulation and more particularly to a regulated rectifier system in which a storage battery is charged from an alternating current source through the agency of a grid controlled rectifier and the rectifier output is regulated so as to maintain a substantially constant voltage across the battery terminals.

It is the object of this invention to simplify and improve regulated rectifier systems of the type commonly used for charging storage batteries.

This object is attained in accordance with a feature of the invention by employing a novel type of regulation circuit which functions to reflect to the control electrode of the rectifier substantially the entire voltage variation experienced by the storage battery charged through the rectifier instead of only a small percentage of the variation as heretofore provided for in systems of this nature.

More specifically, this object is attained by including in the control electrode circuit of the rectifier a constant positive biasing potential of suitable value which opposes the negative potentials impressed on the control electrode by the potentiometer circuit usually employed in reflecting voltage changes in the storage battery to the control grid. Such an arrangement permits the use of substantially one hundred per cent of the voltage in the potentiometer instead of the relatively small percentage of this voltage in influencing the biasing potential on the control electrode of the rectifier.

Another feature of the invention resides in the use of a resistor in the control electrode circuit of the rectifier which serves to limit the current which flows in this circuit and tends to improve load regulation.

A further feature of the invention is embodied in the utilization of the voltage drop in the discharge lead between the battery and the load in influencing the potential bias on the control electrode of the rectifier. This arrangement serves as an aid to regulation, particularly when very low storage battery voltages are used.

A still further feature of the invention contemplates the use of a three-element gas-filled tube and a similar tube of two elements connected for full-wave rectification and a filter coil in the charge lead whose impedance serves to place the output of the diode under control of the output of the triode.

Still another feature of the invention resides in nullifying the effects of line voltage variations on the regulated battery voltage by introducing into the regulating circuit a direct current voltage which varies directly in proportion with the alternating current line voltage.

When three-element grid control gas-filled tubes are used in rectifier circuits, it is necessary that the anode current be prevented from flowing until the filament has reached its normal temperature. In accordance with a further feature of this invention, the control electrode of the rectifier is maintained at a negative potential equal to the peak voltage of the rectifier filament, which potential effectively blocks the tube until the tube filament has reached its normal operating temperature, at which time the control electrode is disassociated from the negative peak voltage of the filament and connected to the regulation circuit.

These and other features of the invention, not specifically identified, will be readily understood from the following detailed description made with reference to the accompanying drawings in which:

Fig. 1 illustrates a half-wave regulated rectifier embodying the features of the invention;

Fig. 2 illustrates the invention applied to a full-wave regulated rectifier comprising a triode and a diode connected for full-wave rectification;

Figure 3:
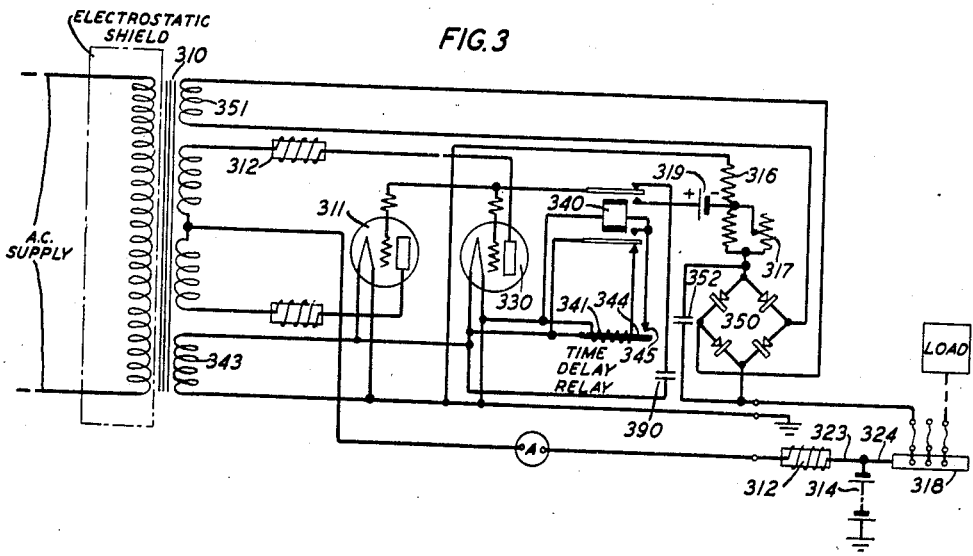
Figure 4:
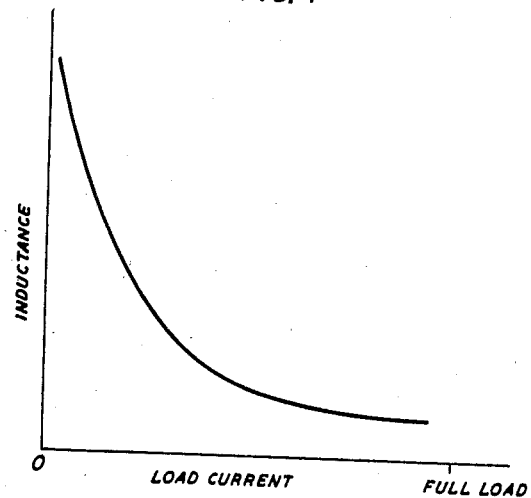

Fig. 3 is a full-wave regulated rectifier employing two three-element tubes and illustrates the line voltage compensating feature and a time delay arrangement for maintaining the rectifier tubes blocked for a predetermined interval of time during which the rectifier filaments have attained their normal operating temperature; and Fig. 4 is a characteristic curve of the filter coil employed in the circuit shown in Figs. 2 and 3, which functions in such a manner as to place the output of one tube of the full-wave rectifier under control of the other tube.

Gaseous discharge tubes usually have three elements, with one or more gases enclosed in their envelopes. Their operation differs from that of vacuum tubes primarily in that the grid does not have continuous control of the space current but only starts it. The plate voltage must then be reduced to zero to stop the space current. If an alternating current voltage is applied to the plate of such a tube, the plate voltage is reduced to zero twice a cycle and a negative direct current voltage of a few volts applied to the grid can prevent any current from flowing. As this negative bias decreases, the space current begins to flow and when the grid voltage approaches zero the tube operates as a two-element tube. The current then depends on the plate voltage and the impedance of the load circuit.

The rectifier system illustrated in Fig. 1 comprises a plate transformer 10, the primary winding of which is connected to a suitable alternating current source (not shown) and whose secondary windings provide filament and plate voltage for the grid controlled gas-filled rectifier tube 11. One terminal of the transformer secondary is connected through the reactor 12 and an ammeter 13 to the negative terminal of battery 14 which is to be charged from the alternating current source by way of the rectifier. The other terminal of the transformer secondary is connected directly to the plate electrode of tube 11. The filament supply winding of transformer 10 has a center tap grounded at 15.

A potentiometer, comprising the resistor 16 and rheostat 17 has one terminal connected to the tube cathode and the other terminal 22 to the load bus bar 18. The potentiometer has a tap 21 to which is connected a series circuit including resistance 31, "C" battery 19, which battery provides a positive bias to oppose the negative voltage from the potentiometer, and a resistor 20, the last being inserted between the positive plate of battery 19 and the grid or control electrode of tube 11. It will be noted that the potentiometer terminal 22 is connected to the bus bar 18 by way of a conductor 23 and thence to the negative terminal of battery 14, by way of discharge conductor 24.

The tube 11 acts as a half-wave rectifier and delivers the direct current output through the filter reactor 12 and ammeter 13 to charge the storage battery 14. A negative voltage is applied to the grid of tube 11 which is supplied by the potentiometer and the dry cell battery 19, the latter providing a positive voltage which is connected in opposition to the voltage provided by the potentiometer. These battery and potentiometer voltages are adjusted so that the resultant voltage applied to the grid is a negative net voltage of such value as to maintain the voltage constant when the output voltage is up to the regulated value.

When the potentiometer is adjusted, with no load on the battery and a battery voltage of 2.15 volts per cell, the negative grid voltage is sufficient to bias the tube to "cut-off" and no current is delivered by the rectifier.

If a load is applied to the battery, its voltage decreases and the voltage drop across the potentiometer experiences a corresponding change which is reflected to the control electrode of tube 11. This reduction in the negative grid voltage permits the tube to break down and carry current, the output current depending upon the reduction in the grid voltage. The output of the tube increases until it is sufficient to return the voltage to the required value.

The alternating current plate voltage is adjusted to provide no more than full load current to be delivered from the rectifier with the minimum grid voltage on tube 11, which represents the low voltage in the regulated range. In this way the rectifier, at full load, is operating as the conventional two-element rectifier and all power of regulation is lost. This feature is desirable in order that the rectifier will not overload appreciably when returning after a power failure, at which time the battery voltage is below the regulated range.

As the rectifier output current starts to flow, the battery 14 charges and the voltage of the direct current circuit increases, thereby raising the negative grid biasing voltage to decrease the rectifier output. The charging current will decrease to a minimum value as the negative grid voltage on the tube approaches its maximum value due to the increasing voltage of the battery. Since, as hereinbefore stated, the alternating current plate voltage is adjusted to provide no more than full load current from the rectifier with the minimum grid voltage, the rectifier will, at full load, operate as a conventional two-element tube rectifier and no further regulation is possible.

Up to full load, any variation in the battery voltage results in a corresponding variation in the grid biasing voltage and, therefore, a corresponding variation in the rectifier output. In this manner, the battery voltage is maintained constant.

By virtue of the "C" battery 19, substantially one hundred per cent of the voltage in the potentiometer is used to affect the grid bias instead of the relatively small percentage possible without the "C" battery. This means that when the battery voltage changes, for example, one volt, this entire change, instead of only a small per cent thereof, is reflected directly on the grid. In other words, the grid voltage swings, for example, over a range of one to five volts while in circuits which do not employ the "C" battery, the grid voltage would operate over a range of only one-quarter of a volt. Therefore, in the present circuit, small changes in the critical characteristics of the tube 11, due to temperature changes, have little effect on the regulated voltage.

With respect to the grid resistor 20, its resistance value must be carefully selected as it serves two purposes. The first purpose is to limit the current which flows through the grid through battery 19 and returns to the cathode of tube 11 and by a proper adjustment of the value of this resistance, the full life span of the battery may be obtained. The second purpose of the grid resistor is to improve the load regulation of the circuit. When no current is flowing in the plate circuit of tube 11, no current flows from the grid. As soon as the space current is established, current begins to flow through the resistor causing a potential drop over it, which is in a direction such as to reduce the grid voltage and increase the rectifier output. This type of operation tends to compound the regulator for load changes.

As hereinbefore stated, the potentiometer is connected to the battery voltage by way of conductor 23, load bus bar 18 and conductor 24. By connecting the positive end of the potentiometer to the cathode of the tube 11 and the negative end to the load circuit, rather than to the charge lead at the rectifier or at the battery itself, advantage is taken of the drop in the charge and discharge leads to improve the load regulation. For example, if a load is applied, the drop in the discharge lead 24 between the battery and the load is reflected over conductor 23 to the regulating potentiometer, which reduces the negative grid voltage and increases the output current. By a careful selection of the potential drops in the charge and discharge leads, the load regulation can be reduced to a small amount.

The condenser 32 and resistance 31 serve to filter the voltage applied to the grid of tube 11 and constitute an anti-hunting circuit.

The system illustrated in Fig. 2 is substantially the same as that shown in Fig. 1, distinguishing therefrom in the provision of a two-element tube 30 which functions with the triode 211 in effecting a full-wave rectifier. The description of Fig. 1 given above applies equally well to Fig. 2 and only those differences caused by the addition of tube 30 will be described in detail.

Under conditions of no load, as hereinbefore stated, the negative grid voltage of tube 211 is sufficient to bias the tube to cut-off and no current is delivered by it. If a load is applied to the battery, its voltage decreases and this voltage change is reflected to the grid of tube 211. This reduction in grid voltage permits the tube to break down and carry current, the output current depending upon the extent to which the grid voltage is reduced. By virtue of the impedance of the filter coil 212, which is connected in the negative output lead and has a characteristic such as illustrated in Fig. 4, the output of tube 30 is controlled by the output of tube 211. If the output of tube 211 is reduced, due to an increasing voltage at the direct current load terminals and a corresponding increase in the negative grid potential, the current in the retardation coil tends to shift from a full-wave to a half-wave in shape. The impedance of the retardation coil has a high reactance to half-wave current which tends to reduce the wave current, thus reducing the output of tube 30. In this way, as the current from tube 211 is reduced under control of the regulator circuit, from maximum to zero, the current from tube 30 is reduced from maximum to a small value. In practice the plate voltage of tube 211 is made slightly higher than the plate voltage of tube 30 in order to compensate for a difference in the arc drop of the two tubes.

The coil 212 may be termed a swinging type or tapered induction coil due to its particular characteristic as shown in Fig. 4. In this figure, load current is plotted against inductance. It will be noted that instead of the usual flat characteristic, the inductance of the coil increases gradually as the load current is decreased from full load to about half load and further decrease in the load current results in a relatively rapid increase in inductance.

The circuit illustrated in Fig. 3 distinguishes from that shown in Fig. 2 primarily in the addition of equipment which functions to compensate for voltage variations in the alternating current line supply and the inclusion of a time delay device which functions to maintain the regulator circuit open until the filaments of the rectifier tubes have been adequately heated. A minor distinction between the circuits shown in Figs. 2 and 3 is that the latter provides for full-wave rectification with two three-element tubes. In other words, the two-element tube 30 of Fig. 2 has been replaced by the three-element tube 330 in Fig. 3.

When the system illustrated in Fig. 3 is placed in operation the regulator circuit is open at the upper front contact of relay 340 and the control electrodes of tubes 311 and 330 are connected to the upper plate of condenser 390 by way of the upper armature and back contact of relay 340. The condenser 390 is connected directly across the filament and grid elements of the tubes so that it is charged to the peak voltage of the filaments. During the half-cycle when the upper end of the filament transformer coil is instantaneously positive, current will flow from this coil end through condenser 390, back contact and upper armature of relay 340 and thence in parallel through the grid-filament circuits of the tubes 330 and 311 to the other end of the filament coil. The condenser plate connected to the grid elements of the tubes is accordingly charged negatively to the peak value of the filament voltage. On the next half-cycle the grids of the tubes act as plates to block the reverse flow of current in the circuit just traced. The condenser 390, however, holds its charge during this period, and until such time as relay 340 operates to disconnect the grid elements of the tubes from the condenser 390 and connect them to the regulator circuit. This negative potential on the control electrodes, which is equal to the peak value of the filament voltage, is sufficiently great to block the tubes and prevent emission from the filaments thereof. The heater winding 341, which controls the operation of thermal element 344, is connected in parallel with the filament of tube 330 across the transformer secondary coil 343. The filament of tube 311 is also connected across the transformer winding 343 so that both filaments begin to heat. As the current continues to flow in the heater coil 341, the thermostat element 344 bends and approaches the contact 345. When contact is made between the element 344 and contact 345, the winding of relay 340 is connected across the transformer winding 343. Relay 340 accordingly energizes and operates. In attracting its upper armature relay 340 removes the negative grid bias supplied by condenser 390 and connects the grids of tubes 311 and 330 to the regulator circuit and at its lower armature and front contact it establishes a locking circuit for itself directly to the transformer winding 343. At its lower contact, the lower armature of relay 340 opens the circuit for heater winding 340 whereupon the thermal element 344 cools and resumes its initial or normal position. The time delay arrangement just described permits the filaments of tubes 311 and 330 to heat sufficiently before the tubes are rendered conductive.

A small copper-oxide rectifier 350 has its direct current terminals connected in series with the regulating lead including the potentiometer (resistors 316 and rheostat 317) and "C" battery 319, and its alternating current terminals connected across a separate insulated winding 351 of transformer 310. A condenser 352 is connected across the direct current terminals of the rectifier 350 for filtering purposes.

The purpose of the combination just described is to introduce in the regulating circuit a direct current voltage which varies directly in proportion with the alternating current line voltage. The effect of this varying direct current voltage is equal and opposite to the effect of line voltage variations and nullifies its effect on the regulated battery voltage. If the alternating current input voltage changes, the regulating circuit tends to compensate for the effect on the plate voltage of the tubes 311 and 330. But the grid voltage required to make the tube fire also changes and causes the output voltage to increase with the plate voltage. This effect is nullified by the small direct current voltage by operating the copper-oxide rectifier 350 from the winding 351 of the transformer 310. If the alternating current input voltage now increases, the direct current voltage supplied by the copper-oxide unit 350 will also increase proportionately and the potential applied to the grids of the tubes 311 and 330 through the grid battery 319 will be more negative. This will cause the tubes to pass current later in the cycle and will compensate for the added input voltage. This compensating feature may be applied also to the rectifier circuits shown in Figs. 1 and 2.

The control circuit of Fig. 3 operates in exactly the same manner as described in connection with the control circuits of Figs. 1 and 2. The tube which has the lowest critical voltage for a given plate voltage will fire first but the output current will be very small because the impedance of the filter 312 remains high until the output voltage is reduced sufficiently to fire the other tube. In other words, the rectifier functions as a half-wave rectifier until the output voltage is reduced sufficiently to fire the other tube, then full-wave operation begins and normal control is exercised. One tube will carry slightly more load than the other but the impedance of the filter coil 312 tends to balance the load between the tubes.

In the system disclosed in Fig. 3 the grid bias is influenced by voltage variations in the direct current load or battery through the agency of the potentiometer (316 and 317), by the voltage of the "C" battery 319, by the voltage variations in the alternating current line circuit through the agency of the copper-oxide rectifier 350 and also by the voltage drop in the discharge lead 324.

What is claimed is:

1. In a regulator system, an alternating current source, a battery and a load, means comprising a gas-filled rectifier for supplying rectified current to said battery and load and having a control electrode, means for regulating the potential of said control electrode in accordance with variations in the voltage of said battery produced by variations in the load and means associated with said regulating means for superposing thereon a unidirectional voltage that varies directly with the voltage of said alternating current source.

2. In a regulator system, an alternating current source, a battery and a load, means comprising a gas-filled rectifier for supplying rectified current to said battery and load and having a control electrode, means for applying a potential to said control electrode which varies in accordance with variations in the voltage of said battery caused by variations of the load, and means for augmenting the potential applied to said control electrode with a unidirectional voltage that varies directly in proportion to the voltage of said alternating current source.

3. In a regulator system, an alternating current source, a battery and load, a discharge lead connecting said battery to said load, rectifier means connected to said source for supplying rectified current to said battery and load comprising a gas-filled triode and a gas-filled diode arranged for full-wave rectification, said triode having a control electrode, and means connected between the control electrode of said triode and load terminal of said discharge lead for regulating the potential on said control electrode whereby the output of said rectifier is regulated in accordance with variations in said load.

4. In a regulator system, an alternating current source, a battery and load, a discharge lead connecting said battery to said load, rectifier means connected to said source for supplying rectified current to said battery and load comprising a gas-filled triode and a gas-filled diode arranged for full-wave rectification, said triode having a control electrode, and means including a source of constant potential connected between the control electrode of said triode and the load terminal of said discharge lead for regulating the potential on said control electrode whereby the output of said rectifier is regulated in accordance with variations in said load.

5. In a regulator system, an alternating current source, a battery and load, a discharge lead connecting said battery to said load, rectifier means connected to said source for supplying rectified current to said battery and load comprising a gas-filled triode and a gas-filled diode arranged for full-wave rectification, said triode having a control electrode, and means including a potentiometer and a source of constant potential connected between said control electrode and the load terminal of said discharge lead for regulating the potential on said control electrode in accordance with variations in said load.

6. In a regulator system, an alternating current source, a battery, rectifier means connected to said source for supplying rectified current to said battery comprising a gas-filled triode and a gas-filled diode connected for full-wave rectification, said triode having a control electrode, means responsive to voltage variations in said battery for applying correspondingly varying potentials on said control electrode and an impedance device included in the charge lead from said triode to said battery for controlling the output of said diode.

7. In a regulator system, an alternating current source, a storage battery, rectifier means for supplying direct current to said battery and comprising an electric discharge device incorporating a cathode, an anode and a control grid and in which substantial emission of electric charges from said cathode is prevented by the application of a negative potential to the control grid, means comprising a transformer for interconnecting said device with said current source and having a secondary coil across which the cathode of said device is connected, regulating means responsive to variations in the voltage of said battery for varying the potential on the control grid of said rectifier means and normally disassociated from said control grid, means effective upon connection of said device with said current source for applying a negative potential corresponding to the peak voltage of said secondary coil to the control grid of said device to prevent substantial emission from the cathode thereof comprising a condenser connected across the cathode and grid electrodes of said device, and means operating a predetermined period of time after the connection of said device with said current source for opening the circuit of said condenser and connecting said control electrode to said regulating means.

DAVID E. TRUCKSESS.